US005393975A

United States Patent [19]

Hail et al.

[11] Patent Number: 5,393,975

[45] Date of Patent: Feb. 28, 1995

[54] ELECTROSPRAY ION SOURCE AND INTERFACE APPARATUS AND METHOD

[75] Inventors: Mark E. Hail, Alameda County; Iain C. Mylchreest, Santa Clara County, both of Calif.

[73] Assignees: Finnigan Corporation, San Jose, Calif.; Analytica of Branford, Inc., Branford, Conn.

[21] Appl. No.: 945,993

[22] Filed: Sep. 15, 1992

Related U.S. Application Data

[63] Continuation of Ser. No. 814,063, Dec. 20, 1991, Pat. No. 5,170,053, which is a continuation of Ser. No. 575,183, Aug. 30, 1990, abandoned.

[51] Int. Cl.[6] ........................ B01D 59/44; H01J 49/00

[52] U.S. Cl. .................................... 250/288; 250/281; 250/282

[58] Field of Search ............. 250/288, 281, 282, 423 P

[56] References Cited

U.S. PATENT DOCUMENTS

| | | | |
|---|---|---|---|
| 4,531,056 | 7/1985 | Labowsky et al. | 250/288 |
| 4,542,293 | 9/1985 | Fenn et al. | 250/288 |
| 4,842,701 | 6/1989 | Smith et al. | 204/180.1 |
| 4,861,988 | 8/1989 | Henion et al. | 250/288 |
| 4,885,076 | 12/1989 | Smith et al. | 250/288 |
| 4,977,785 | 12/1990 | Willoughby et al. | 250/288 |
| 4,982,097 | 1/1991 | Silivon et al. | 250/288 |
| 5,115,131 | 5/1992 | Jorgenson et al. | 250/288 |
| 5,122,670 | 6/1992 | Mylchreest et al. | 250/288 |
| 5,170,053 | 12/1992 | Hail et al. | 250/281 |

*Primary Examiner*—Bruce C. Anderson

*Attorney, Agent, or Firm*—Flehr Hohbach Test Albritton & Herbert

[57] ABSTRACT

An electrospray interlace apparatus is disclosed. The apparatus includes an inner needle for transferring a liquid sample to an ionizing region at one end of the needle. A first outer tube surrounds and is spaced apart from the needle to form a cylindrical space through which a flowing liquid may pass. The tube has one end extending beyond the end of the needle to define a mixing volume where the sample and liquid can mix. A second outer tube surrounds the first tube to define a second cylindrical space for flowing a gas past the end of the first tube and needle to focus the electrospray. A voltage is also provided between the tips of the needle and the tubes and an adjacent surface.

23 Claims, 3 Drawing Sheets

ELECTROSPRAY ION SOURCE AND INTERFACE APPARATUS AND METHOD

This is a continuation of application Ser. No. 07/814,063, filed on Dec. 20, 1991, U.S. Pat. No. 5,170,053, which is a continuation of application Ser. No. 07/575,183, filed on Aug. 30, 1990, abandoned.

BRIEF DESCRIPTION OF THE INVENTION

This invention relates generally to an electrospray ion source and interface apparatus and method and more particularly to an interface apparatus and method for an ion source.

BACKGROUND OF THE INVENTION

The electrospray process consists of flowing sample liquid through a small tube or capillary which is maintained at a high voltage with respect to a nearby surface. The liquid is dispersed into fine electrically charged droplets by the voltage gradient of the tip of the capillary. The ionization mechanism involves the desorption at atmospheric pressure of ions from the fine electrically charged particles. In many cases a heated gas is flowed in counter current to the electrospray to enhance dissolution of the electrospray droplets. The ions created by the electrospray are then mass analyzed in a mass analyzer such as a mass spectrometer.

Under the appropriate conditions, the electrospray resembles a symmetrical cone consisting of a very fine mist (or fog) of droplets (ca. 1 $\mu m$ in diameter). Excellent sensitivity and ion current stability can be obtained if the fine mist is produced. Unfortunately, the electrospray "quality" is highly dependent on the bulk properties of the solution being analyzed. The most important of which are surface tension and conductivity. A poor quality electrospray may contain larger droplets ($>10$ $\mu m$ diameter) or a non-dispersed droplet stream. Larger droplets lead to decreased sensitivity. In addition, sputtering may occur. The partially desolvated droplets pass into a vacuum system causing sudden increases in pressure and instabilities in the ion current from a mass spectrometer.

Stable electrosprays are more difficult to obtain in the negative ion mode than in the positive ion mode due to the onset of corona discharge at lower voltages. Corona is facilitated in the negative mode due to the strong negative potential at the needle, which favors emission of electrons from the needle surface. Corona is detrimental to the electrospray process since the plasma produced creates a space-charged region that shields the tip of the needle from the electric fields necessary for droplet dispersion.

Low surface tension is preferable since electrostatic dispersion of droplets only occurs when coulomb forces exceed those due to surface tension. Most organic solvents have low surface tension (e.g., methanol, $Y=24$ dynes/cm) and are readily electrosprayed; however, water has a very high surface tension ($Y=72$ dynes/cm) and cannot be directly electrosprayed. Unfortunately, one may not simply increase the electrospray voltage to spray 100% water, since the onset of corona occurs before water can be effectively dispersed. Organic solvents can be mixed with water to lower surface tension for electrospray compatibility; however, for many chromatographic applications, the use of high percentages of organic solvents may impose serious compromises on the separations.

High solution conductivities also degrade electrospray performance. Although the reasons for this are not fully understood, it is believed that the charge density becomes too high for efficient separation of opposite charges at the tip of the needle. In any case, our experience is that ESI efficiency decreases dramatically as ionic strength is increased beyond $10^{-3}$ Molar.

One particularly important application of ESI is its use with reverse phase high-performance liquid chromatography (HPLC). In particular, for separations of peptides and proteins, gradients from 100% $H_2O$ to 40% $H_2O$/60% acetonitrile are most often required. In addition, 0.1% trifluoroacetic acid (TFA) is usually added to both solvents to improve the separation quality. Since TFA is a relatively strong acid, its presence at the 0.1% level leads to high solution conductivity and poor electrospray quality. This combination of high water content and high solution conductivity makes it impossible to perform LC/MS with traditional electrospray.

There have been a number of attempts to provide an improved electrospray ion source. Mock et al., J. Chem Phys 52, 10 (1970) teach that the electrospray formation and evaporation rates can be improved by flowing nitrogen through the cylindrical span between the capillary needle and a surrounding tube past the tip of the needle. Henion teaches much the same technique in U.S. Pat. No. 4,861,988. Smith et al. U.S. Pat. No. 4,842,701 teaches the use of liquid sheath flow past the end of the needle. The liquid sheath is used to reduce the sample liquid surface tension. It has been suggested that these two techniques can be combined to provide a pneumatically assisted liquid sheath.

OBJECTS AND SUMMARY OF THE INVENTION

An object of the present invention is to provide an improved electrospray apparatus and method.

It is another object of the invention to provide an improved electrospray apparatus which uses concentric flow of sample, liquid sheath and gas sheath.

It is a further object of the invention to provide an apparatus in which a sample fluid is mixed with a sheath liquid to form a mixture which is electrosprayed and focused by a gas.

The foregoing and other objects of the invention are achieved by an electrospray interface apparatus which includes an inner needle for transferring a liquid sample to an ionizing region at one end of the needle, a first outer tube surrounding and spaced from said needle to form a cylindrical space for flowing a liquid past the tip of said needle, said tube having one end extending beyond the end of said needle to define a mixing volume wherein the sample and liquid can mix, and a second outer tube surrounding the first tube to define a second cylindrical space for flowing a gas past the end of said first tube and needle to focus the electrospray, and means for providing a voltage between the tips of said needle and tubes and an adjacent surface.

BRIEF DESCRIPTION OF THE DRAWINGS

The foregoing and other objects of the invention will be more clearly understood from the description to follow when read in conjunction with the accompanying drawings of which.

DESCRIPTION OF PREFERRED EMBODIMENT

Figure 1:
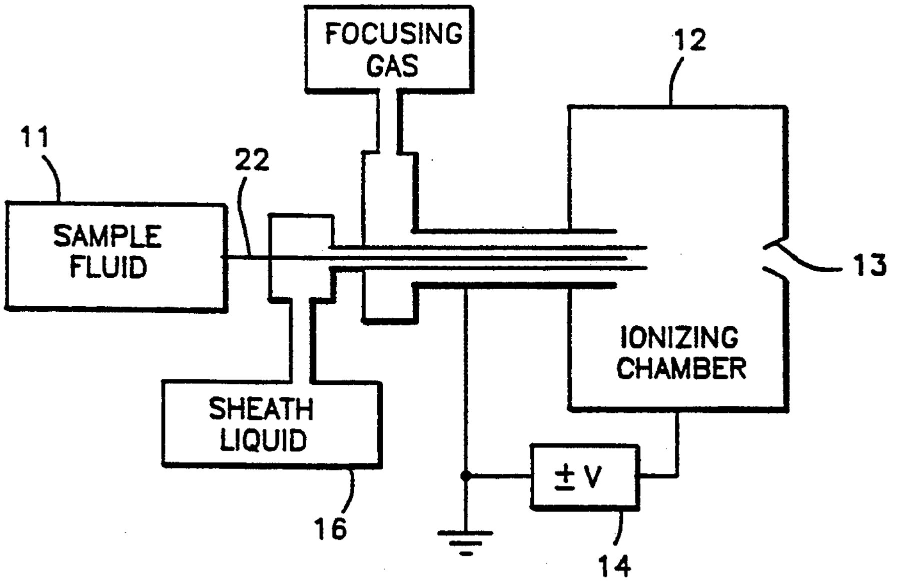
FIG. 1 is a diagrammatic view of an electrospray ion source and interface apparatus in accordance with the invention.

FIG. 1 schematically shows an electrospray ion source in accordance with the invention, a sample fluid to be analyzed which may be the eluent from a liquid chromatograph or capillary zone electrophoresis apparatus is represented by the block 11. The fluid is conveyed into the ionizing chamber 12 by a capillary tube or needle 22. The ionizing chamber includes an aperture 13 which communicates with an associated mass analyzer such as a quadrupole mass analyzer. A high positive or negative DC voltage 14 is applied between a surface of the ionizing chamber facing the needle and the needle to create ions by electrospray. In accordance with the invention two spaced concentric tubes 26 and 28 surround the needle and define two cylindrical spaces. A sheath liquid is supplied under pressure from a source 16 to the inner cylindrical space and a gas is supplied under pressure from the source to the outer cylindrical space. The fluid and liquid mix at the tip of the interface apparatus and the electrospray mixture is focused by the gas, as will be presently described.

Figure 2:
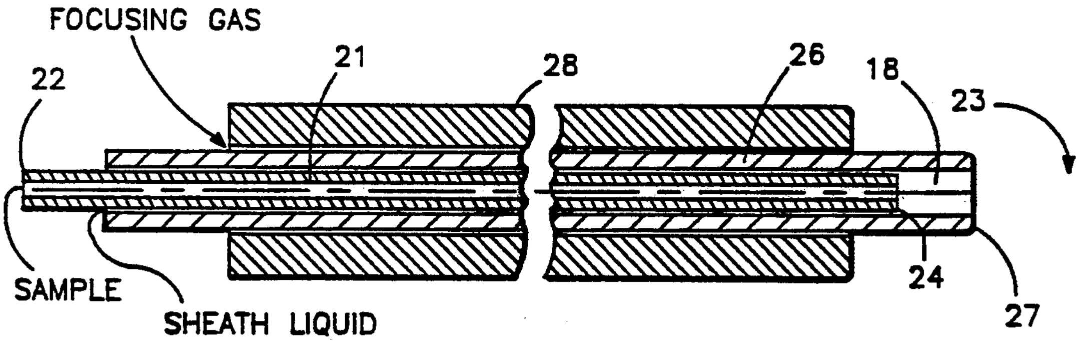
FIG. 2 shows an ion electrospray interface apparatus in accordance with the invention.
Figure 3:
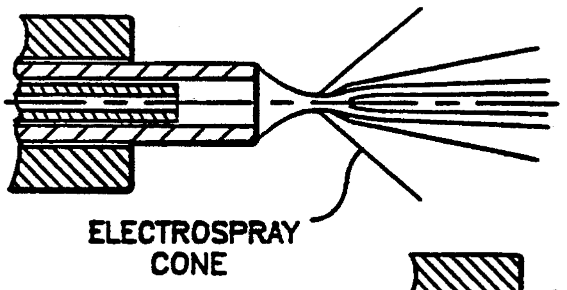
FIG. 3 shows the electrosrpay cone at the tip of the apparatus of FIG. 2 when only the sample and sheath liquid are electrosprayed.
Figure 4:
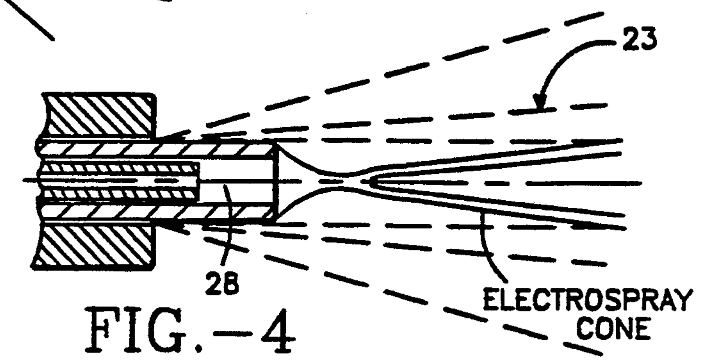
FIG. 4 shows the electrospray cone at the tip of the apparatus of FIG. 2 with concentric flows of sample, sheath liquid and focusing gas.

The electrospray interface apparatus is shown in more detail in FIGS. 2-4. The apparatus includes a metal capillary or needle 21 which receives the sample fluid at one end 22 and delivers it into an ionization zone 23 at its other end 24. The inner diameter of the needle is generally in the range of 0.05 to 0.5 mm. A first tube 26 surrounds the needle and is spaced therefrom to form a cylindrical space. The space between the outer surface-of the needle and the inner surface of the first tube is in the range of 0.01 to 0.5 mm or more.

The end 27 of the tube extends beyond the end 24 of the needle to form a mixing volume 28. The end extends beyond the needle a distance of between 0.1 and 3 mm. A sheath liquid is caused to flow in the annular space where it mixes with the sample fluid in the mixing volume 28. The first tube is surrounded by a second tube 29 which is spaced from the second tube to form an outer cylindrical space for directing an enveloping gas to the end 27 of the first tube. The space between the outer surface of the first tube and inner surface of the second tube is in the range of 0.01 and 0.5 mm. The gas serves to focus the electrospray, leaving the end of the interface apparatus. FIG. 2 shows the electrospray cone without a focusing gas and FIG. 3 shows the electrospray cone with focusing gas.

The primary purpose of the liquid sheath is to reduce the surface tension of the eluent stream in order to allow compatibility with solutions containing high percentages of water. The concentric gas flow is particularly important in that it provides an additional stabilizing factor when solutions of high conductivity are electrosprayed.

Proper choice of the sheathing liquid is important for obtaining stable operation over a gradient separation. Virtually any water miscible solvent provides satisfactory performance when used as a sheathing liquid. For example, acetonitrile, methanol, and i-propanol provide stable performance. However, preliminary results suggest that i-propanol or methanol may provide lower background noise than acetonitrile, as frequent noise spikes are often observed when acetonitrile is used. These noise spikes are thought to be due to the formation of larger droplets that are directed through the ESI vacuum/atmosphere interface. Alcohols, particularly i-propanol are widely used as "wetting" agents in many applications to reduce the surface tension of water by reducing hydrogen bonding forces between adjacent water molecules. Therefore, it is believed that the alcohols (i-propanol and methanol) provide more efficient mixing which may minimize formation of these large water droplets.

The sample tube is slightly recessed into the liquid sheath tube in order to obtain adequate mixing of the sample and sheath liquids. Mixing of the two liquids is necessary if stable operation is to be obtained over a wide range of solvent compositions. An effective mixing volume of only 5–50 nL is obtained if the inset distance of the sample tube is 0.1–1 mm inside the liquid sheath tube. The selection of small diameter and small thickness sheath tubing is important in order to minimize dead volumes which would degrade chromatographic separation.

Sheath-to-sample flow rate ratios of 1:1 to 2:1 typically provide optimal results with 100% aqueous solutions. Sheathing ratios of up to 10:1 are possible, however, increasing sheathing flow beyond the optimum only serves to dilute the sample and reduce signal intensity.

Even though the sheath liquid is very effective in lowering surface tension for electrostatic dispersion of 100% water, liquid sheathing does not greatly reduce the effects of solution conductivity. Large droplets and droplet streams are produced from high conductivity solutions which results in unstable performance. Therefore, the sheath liquid alone does not provide suitable ion current stability for gradient LC utilizing 0.1% TFA. Ion current fluctuations of ±20% RSD are typical of this method when 0.1% TFA is used.

Figure 5:
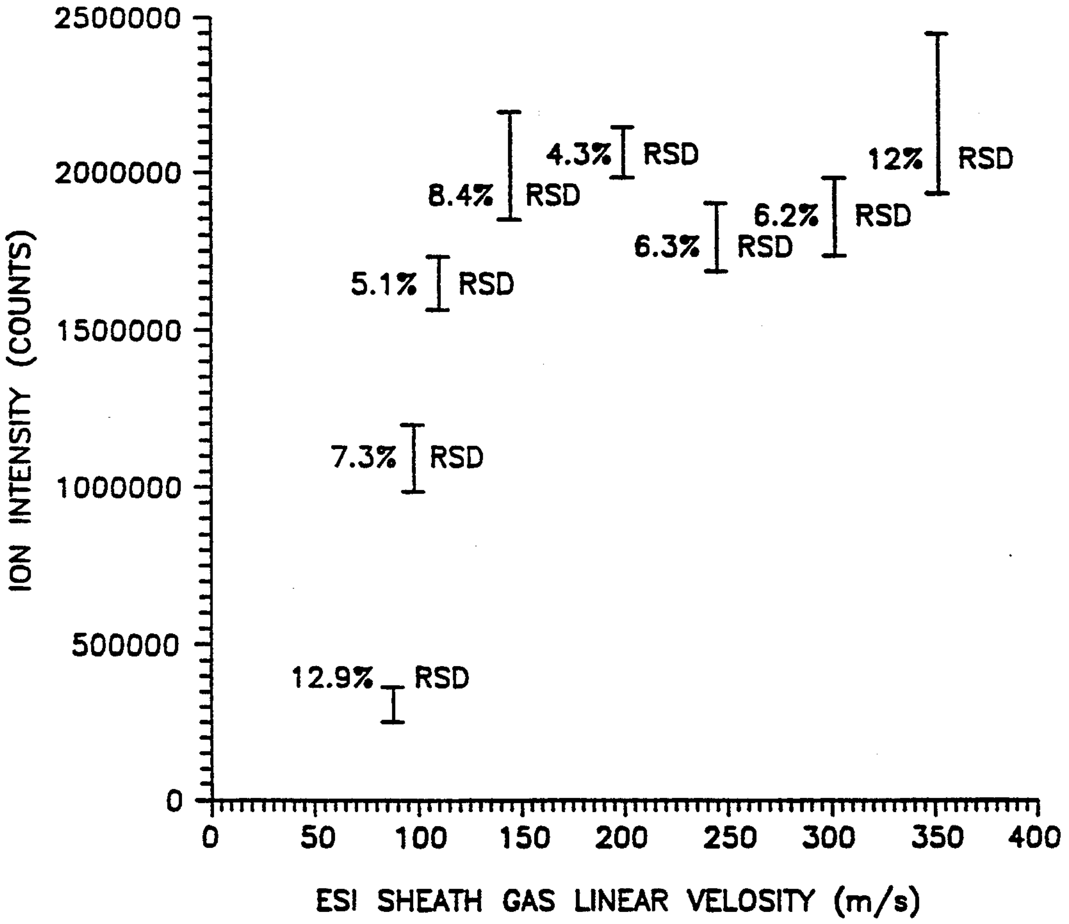
FIG. 5 shows the effects of focusing gas flow upon the electrospray ion intensity and stability for different gas velocities.

Adding the concentric gas flow in addition to the liquid sheath dramatically improves ion current stability (typically less than 7% RSD) by preventing formation of large droplets and droplet streams. In addition, the sheath gas flow appears to focus the electrospray cone and provides an improvement in sensitivity (ca. a factor of 3–5) for solutions that are not easily electrosprayed. (Note the gas flow does not provide sensitivity enhancement for solutions that are easily electrosprayed). The effects of sheath gas flow are demonstrated in FIG. 5 which shows the dependence of signal intensity and stability on the linear velocity of the concentric gas. For each point on the graph, 100–200 signal intensity measurements were made to obtain an indication of ion current stability for a solution containing 100% water and 0.1% TFA. As shown in the figure, signal increases with gas velocity until a plateau is reached beyond 150 m/s. Optimum performance is obtained between 150–350 m/s. Operation above 350 m/s leads to reduced ion current stability.

Due to the fact that the sheath gas imparts higher velocity to the electrospray droplets, elevated ESI drying gas temperatures are desirable for complete desolvation. For example, when the sheath gas flow is utilized, drying gas temperatures of 60°–70° C. are preferred (as opposed to 40°–50° C. for normal operation). The elevated temperatures may also improve performance due to lowering of droplet surface tension or evaporation of the TFA.

Figure 6:
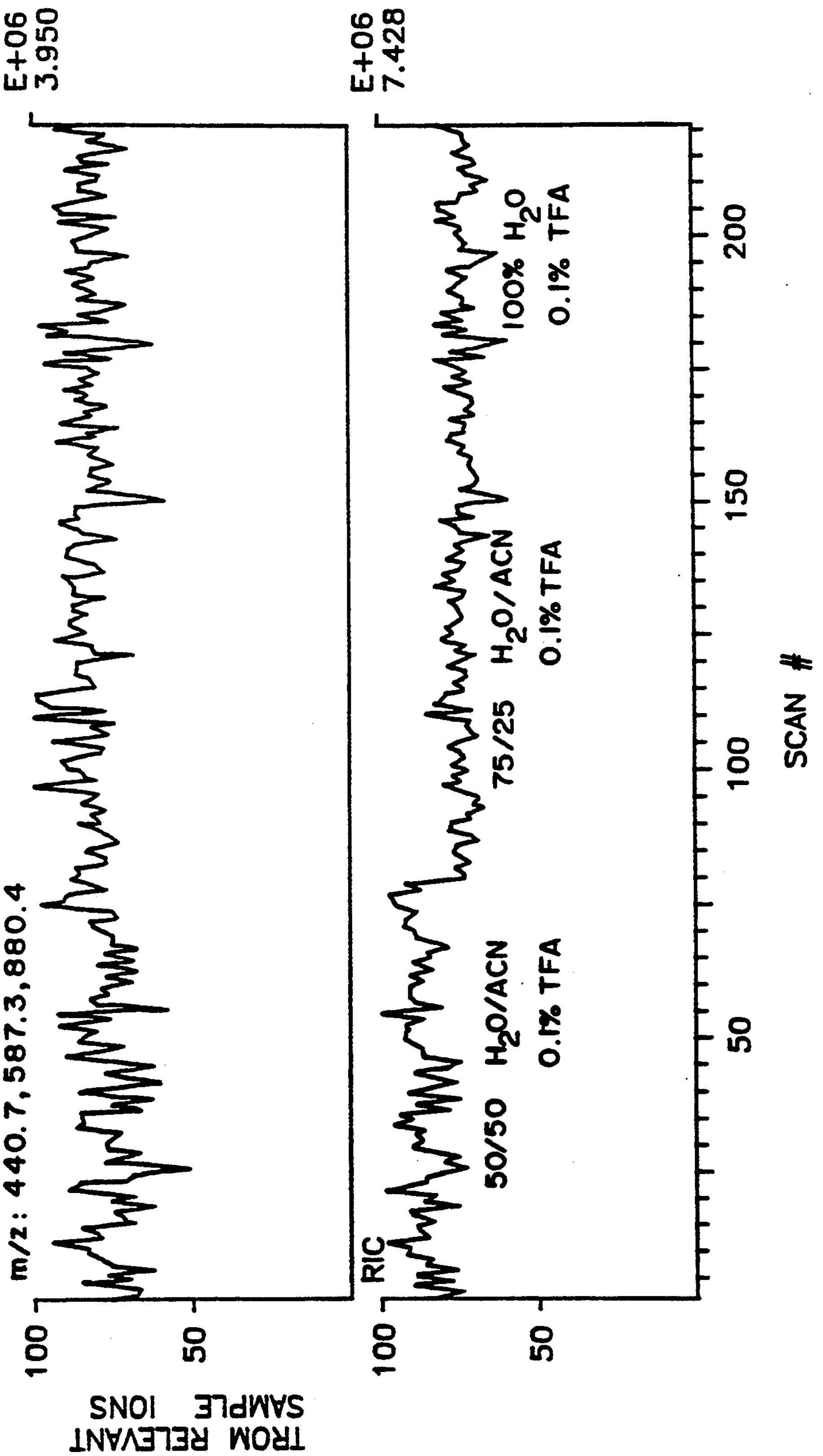
FIG. 6 shows signal intensity as a function of scan number for different solutions containing from 50% water to 100% water.

The use of the multi-layered flow system increases the ruggedness of the electrospray process. For example, under one set of operating conditions, the core sample flow was changed from 2–5 μL/min without significant changes in performance. As was shown in FIG. 5, sheath gas linear velocities of 150–350 m/s may be utilized without dramatic changes in performance. In addition, due to the focusing character of the sheath gas, the location of the ESI needle relative to the capillary nozzle (vacuum/atmosphere interface 13) is not as critical as with conventional electrospray. The system readily accommodates solutions containing high percentages of water without sensitivity compromises. This is demonstrated in FIG. 6, which shows a plot of signal intensity vs. scan number for different solutions containing from 50% water to 100% water. An additional benefit of the multi-layer flow technique is that stability in the negative ion mode is increased. For negative ion production other researchers have utilized an additional flow of oxygen or other electron scavenging gas at the needle tip to suppress corona. The sheath flows allow operation at lower electrospray voltages such that corona discharge is avoided and additional flow of oxygen is not required. Because of the benefits discussed above, day-to-day reproducibility and general ease of use appears to be improved.

In summary, a combination of both gas and liquid concentric flows and liquid-sample mixing has been utilized to improve the performance of electrospray ionization for gradient LC/MS (or CZE/MS) in both positive and negative ion modes. The addition of the appropriate sheath liquid and mixing with the sample, is important in reducing the surface tension of the eluent stream. This allows constant performance regardless of aqueous content. The concentric gas flow helps to focus the electrospray and improves stability for highly conductive solutions.

What is claimed is:

1. An electrospray interface apparatus for supplying and ionizing a sample bearing fluid comprising an ionization chamber, an inner hollow electrically conductive needle for conveying the sample fluid having its exit end extending into said ionization chamber, a first conductive tube surrounding and spaced from said needle to define a first cylindrical annular space and having the exit end extending into the ionization chamber beyond the exit end of the needle to define a mixing volume between the inner surface of said first tube and the exit end of said needle, said first cylindrical annular space serving to convey a sheath liquid to said mixing volume for mixing with said sample bearing fluid, means for applying a high voltage between said ionization chamber and said inner hollow needle and first tube to form an electrospray, and a second tube surrounding and spaced from said first tube to define therebetween a second cylindrical annular space for conveying a focusing gas to the exit end of said first tube to sheath said electrospray.

2. An apparatus as in claim 1 wherein the end of said first tube extends beyond the end of said needle a distance of 0 mm to 5 mm.

3. An apparatus as in claim 1 wherein said sheath liquid is a water miscible solvent.

4. An apparatus as in claim 3 wherein the sample bearing fluid contains water and wherein the sheath liquid is water miscible and selected from the group comprising acetonitrile, methanol and i-propanol.

5. An apparatus as in claim 1 wherein the sample bearing fluid contains water and wherein said sheath liquid is a water miscible solvent.

6. An apparatus as in claim 1 wherein the sample bearing fluid contains water and wherein the sheath liquid is water miscible and selected from the group comprising acetonitrile, methanol and i-propanol.

7. An electrospray ion source comprising:

an ionization chamber, an electrospray interface apparatus for supplying sample bearing fluid to said ionization chamber and for ionizing the same to form sample ions, said electrospray interface apparatus comprising an inner hollow conductive needle having an exit end extending into said ionization chamber, a first conductive tube surrounding and spaced from said needle to form a first cylindrical annular space, the exit end of said first tube extending into said ionization chamber beyond said exit end of said needle to define a mixing volume between the inner surface of said first tube and the exit ends of said needle and first tube, said first cylindrical annular space serving to convey a sheath liquid to said mixing volume for mixing with said sample bearing fluid, a second tube surrounding and radially spaced from said first tube to define therewith a second cylindrical annular space, means for supplying a sample bearing fluid through said needle to cause fluid exiting said needle to flow into said ionization chamber, means for supplying a sheathing liquid through said first cylindrical annular space to flow into said mixing volume to mix with the sample bearing fluid to form a mixture, means for applying a voltage between the walls of said ionization chamber and said ends of said needle and first tube to form an electrospray of said mixture, and means for supplying a focusing gas through said second cylindrical annular space to sheath said electrospray.

8. An ion source as in claim 7 wherein said first cylindrical annular space is in the range of about 0.01 to 0.1 mm and said second cylindrical annular space is in the range of about 0.04 to 0.5 mm.

9. An ion source as in claim 7 or 8 wherein the flow rate of the sample bearing liquid through said needle is in the range of about 0.1 μl/min. to 50 μl/min. and the flow rate of said sheathing liquid is in the range of about 0.1 μl/min. to 200 μl/min.

10. An apparatus as in claim 7 or 8 wherein the gas flow rate through said first cylindrical annular space is selected to provide a velocity at said exit end of said first tube in the range of about 100 m/sec. to 350 m/sec.

11. An ion source as in claim 7 wherein said second cylindrical annular space is in the range of about 0.01 to 0.04 mm.

12. An apparatus as in claim 7 or 1 wherein the gas flow rate through said first cylindrical annular space is in the range of about 90 to 1,250 cc/min. with linear velocities at said exit end ranging from about 100 to 350 m/sec.

13. The method of ionizing a sample bearing fluid in an ionization chamber by electrospray ionization which comprises the steps of introducing the sample bearing fluid into the ionization chamber through a hollow conductive needle whose exit end extends into said ionization chamber, introducing a sheathing liquid into said ionization chamber through an annular space formed between a surrounding conductive first tube and said needle, the said exit end of said tube extending beyond the exit end of said needle so that said sheathing liquid surrounds the exit end of said needle, mixing in a mixing volume defined between the exit ends of said needle and said first tube said sheathing liquid and the sample bearing fluid to form a mixture, applying a high voltage between the walls of said ionization chamber and said exit ends of said conductive needle and said first tube to form an electrospray, and introducing a focusing gas through the annular space defined between said first tube and a surrounding second cylindrical tube to sheath the electrospray.

14. A method as in claim 13 wherein the end of said first tube extends beyond said end of said needle by a distance in the range of about 0 mm to 5 mm.

15. A method as in claim 13 or 14 wherein said sheathing liquid is a water miscible solvent.

16. A method as in claim 13 or 15 wherein the sample bearing fluid contains water and wherein said sheathing liquid is a water miscible solvent.

17. A method as in claim 13 or 16 wherein the sample bearing fluid contains water and wherein said sheathing liquid is water miscible and selected from the group comprising acetonitrile, methanol, isopropanol and i-propanol.

18. A method of ionizing a sample bearing fluid in an electrospray ionization source including an ionization chamber, which comprises the steps of introducing said sample bearing fluid into said ionization chamber through a hollow conductive needle whose exit end extends into said ionization chamber, introducing a sheathing liquid into said ionization chamber through a first annular space between said needle and a surrounding first conductive tube whose exit end extends beyond the exit end of said needle so that said sheathing liquid surrounds the end of said hollow needle, mixing said sheathing liquid and said sample bearing fluid to form a mixture in a mixing volume, said mixing volume defined as the region between said exit of said needle and said exit end of said first tube, applying a voltage between the walls of said ionization chamber and said ends of said needle and first tube to form an electrospray, and introducing a focusing gas through a second annular space defined between said first tube and a surrounding second cylindrical tube to sheath said electrospray.

19. A method as in claim 18 wherein said first annular space is in the range of about 0.01 and 0.1 mm and said second annular space is in the range of about 0.04 to 0.5 mm.

20. A method as in claim 18 wherein said second annular space is in the range of about 0.01 to 0.04 mm.

21. A method as in claim 18 or 19 wherein the flow rate of said sample bearing liquid through said needle is in the range of about 0.1 μl/min to 50 μl/min., and the flow rate of said sheathing liquid is in the range of about 0.1 μl/min to 200 μl/min.

22. A method as in claim 18 or 19 wherein the flow rate of said focusing gas through said second annular space is in the range of about 90 to 1,250 cc/min with linear velocities at the exit end of said needle ranging from about 100 to 350 m/sec.

23. A method as in claim 19 wherein the flow rate of said focusing gas through said second annular space is in the range of about 0 to 2,500 cc/min. with linear velocities at the exit end of said needle ranging from about 0 to 440 m/sec.

* * * * *

UNITED STATES PATENT AND TRADEMARK OFFICE

CERTIFICATE OF CORRECTION

PATENT NO. : 5,393,975

DATED : February 28, 1995

INVENTOR(S) : Mark E. Hail, et al.

It is certified that error appears in the above-identified patent and that said Letters Patent is hereby corrected as shown below: On the title page:Item

[75], add --and John B. Fenn and Craig M. Whitehouse, both of New Haven County, Connecticut, and Shida nmi Shen, of Middlesex County, Connecticut--

Signed and Sealed this

Eighteenth Day of July, 1995

*Attest:*

BRUCE LEHMAN

*Attesting Officer*

*Commissioner of Patents and Trademarks*